United States Patent [19]

Isuge et al.

[11] 3,888,771

[45] June 10, 1975

[54] HOLLOW FIBERS OF CUPRAMMONIUM CELLULOSE AND A PROCESS OF THE MANUFACTURE OF SAME

[75] Inventors: Masami Isuge; Shinichi Uematsu; Yotsuo Ono; Shokichi Eiga; Minoru Makita, all of Nobeoka, Japan

[73] Assignee: Asahi Kasei Kogyo Kabushiki Kaisha, Osaka, Japan

[22] Filed: May 31, 1973

[21] Appl. No.: 365,500

[30] Foreign Application Priority Data
June 2, 1972 Japan.............................. 47-54291
May 9, 1973 Japan.............................. 48-51410

[52] U.S. Cl. ........................ 210/500 M; 264/199
[51] Int. Cl. ........................................... B01d 31/00
[58] Field of Search ............. 210/22, 23, 321, 500; 106/167; 264/199, 204, 210 F, 44; 260/233, 230, 232

[56] References Cited
UNITED STATES PATENTS

| | | | |
|---|---|---|---|
| 3,049,755 | 8/1962 | Aizawa et al. .................. | 264/199 X |
| 3,228,877 | 1/1966 | Mahon ............................ | 210/321 X |
| 3,423,491 | 1/1969 | McLain et al. ................... | 264/49 |
| 3,674,628 | 7/1972 | Fabre .............................. | 264/209 X |

*Primary Examiner*—Frank A. Spear, Jr.
*Attorney, Agent, or Firm*—Armstrong, Nikaido & Wegner

[57] ABSTRACT

An improved dialyzing hollow fiber of cuprammonium regenerated cellulose, showing a substantially similar network structure of fine gap passage routes having a max. gap size of 200 A when seen at its any cross-section and logitudinal section, having skinless structure at its inside and outside surface of the hollow fiber and representing a superior water permeability.

7 Claims, 3 Drawing Figures

HOLLOW FIBERS OF CUPRAMMONIUM CELLULOSE AND A PROCESS OF THE MANUFACTURE OF SAME

This invention relates to improved hollow fibers especially adapted for use as dialytic means in an artificial kidney or the like dialytic appliances, and to a process for the manufacture of same.

Although the following description is directed substantially to the use for the artificial kidney unit as a most preferrable embodiment of the present invention, it should be stressly noted that the invention should not limited to such specific usage. On the contrary, indeed, the invention can be broadly and successfully applied to various other purposes such as reversible osmosis, gas separation, ultrafiltration and the like.

Conventionally, the membrane filters have hitherto been utilized for similar purposes as above, however, with only a poor space efficiency and replaced gradually by artificially made hollow fibers.

This kind of hollow fibers are classified concerning the manufacturing material into two general classes. One of them is of the synthetic fiber class which is made of, such as, for instance, nylon or acrylic polymer, while the other is of the regenerated fiber class which is made of, such as, for instance, cellulose triacetate or its deacetylated product.

According to our practical experience, however, the first class of hollow fibers has on account of their synthetic nature, only a slight affinity to the living human body and shows a coagulating tendency of the treated blood. On the other hand, the dialytic pores of the first class of hollow fibers represent generally round cross-section and it is highly difficult to control the pore dimensions during the manufacture of the hollow fibers. When it is tried to make the wall thickness of the regenerated cellulose hollow fiber for improving the dialytic performance thereof, on the other hand, dangerous pin holes are liable to form, as a grave drawback.

On the other hand, the regenerated series hollow fibers represent generally and frequently a net-like fine gap structure, as of a cottom mass, thus showing practically no pores, but a net structure of mutually connecting fine gap passages. The fiber has a high degree of safety against the formation of disadvantageous pin holes during the manufacturing stage of the hollow fiber.

Main desirous factors to be owned by the hollow fiber adapted for use in blood dialysis are a high water permeability, a high performance of dialysis for lower molecule waste substances, such as urea, uric acid and creatinine and a slightest possible passage ability for higher molecule substances, such as protein (albumin as an example), hemoglobin, amino acid, dextrose, vitamines, hormons and the like.

Conventional dialytic membrane, preferably that of cellophane made of cuprammonium regenerated cellulose is said to represent a distribution of fine dialytic pores or gaps having diametral dimension of the order of 10 – 90 A, mainly of about 30 A in the mean. As is well known, the cellulose consists of crystalline and amorphous parts, of which the former parts are believed, when considering the fine gap structure of a cellulose mass relative to the concept of the "pores" of a thin film of cellulose, not to have almost any role in the dialysis of lower molecule substances, while the former parts do contribute for the dialytic performance. During the progress of the dialysis, and upon swelling of the amorphous parts of the cellulose with water by invasion of the molecules of the latter among the cellulose molecules, resulting in the molecular chains forced to have enlarged interchain gaps through which the lower molecular substances can pass during the dialysis.

It is believed that the cellulosic hollow fibers prepared through the way of deacetylation of cellulose triacetate consist also of cellulose and that the "pore" dimensions and the distribution mode of the "pores" are of similar to those of the cellophane membrane. It is further believed that with substantial similar "pore" dimensions and "pore" distribution with those of cellophane membrane, a substantial and favorable improvement of the hollow fiber in relation to its water permeability can not be attained.

It is, therefore, an object of the present invention to provide a substantially improved regenerated series of dialytic hollow fiber representing a high performance of water permeability than that owned by conventional hollow fibers and devoid of dangerous pin holes, thus being highly reliable in the use of the dialytic organs of an artificial kidney unit, and a preferable process for the manufacture of same.

In the process according to this invention, cuprammonium regenerated cellulose is used as the fiber-forming material, and indeed, from the following reasons.

As is commonly known, the hollow fiber made of cellulose triacetate per se has such grave drawback that during its use, the acetic acid radical is removed off from the fiber and act disadvantageously and dangerously upon the blood under treatment. In the case of the deacetylated fiber of cellulose triacetate, the same phenomenon will frequently take place by the very presence of the residual acetic acid content, even to a lesser degree.

According to our profound experimental results of the use of regenerated cellulose hollow fibers prepared through the deacetylation of cellulose triacetate, it has been experienced that only an insufficient water permeability is provided, thereby the operational period of the pacient being unacceptably extended. It is, therefore, a sincere desire prevailing among those skilled in the art to provide hollow fibers having a substantially improved, higher water permeability.

It has also been proposed to prepare dialytic hollow fibers from cellulose ester. With use of cellulose ester, not only the superfluous and rather complicated step of deacetylation is dispensed with, but also a satisfactory degree of dialyzing performance of the hollow fiber can be assured without difficulty. On the other hand, however, the spinning dope, having such a composition as an example: acetyl cellulose 30 wt. % in acetone/formamide 40 : 60, is extruded into the desired hollow fiber which has yet the unsolved problem of safety as before.

According to our detailed investigation, it has been found that easily scaling-off deposits of small size appear on the inner wall surface of the conventional dialyzing hollow fiber and there are fine minor undulations formed on the said wall surface. These fine deposits and minor undulations are liable to accelerate the coagulation of the human blood under treatment and frequently to thereby invite cloggings of the hollow passage of the fiber under consideration. This kind of conventional drawback constitutes also a grave defect which reduces substantially the operational efficiency of the artificial kidney unit.

According to our novel teaching, when the hollow fiber is manufactured as its starting material from cuprammonium regenerated cellulose, it has been amazingly found that the overall structure of the fiber represents a several times increased dialyzing performance in comparison with that of the prior art representative hollow fibers, thanks to its amazingly even and well formed net work of gap passage routes. The hollow fiber represents no minor deposits on the inside wall surface which is highly smooth and shows no fine undulations, thereby providing no problem of safety in the aforementioned sense, thus providing an ideal hollow fiber highly adapted for dialytic purpose.

As the coagulation bath liquid for the cuprammonium cellulosic spinning liquor, use has been tried by us of aqueous acid solution. It has been found, however, that when observed the cross-sectional structure of the thus prepared hollow fiber from inside to outside thereof, the porous structure varies gradually from rough to fine, the fine gaps in the rather rough region being in the order of several thousand A. However, the overall dialyzing power of such hollow fiber was rather inferior in comparison with that of the conventional representative one, the reason therefor being supposed to reside in the very presence of the highly fine outer zone in which only very fine gap passage routes are formed in rather limited number. This kind of hollow fiber may be called the skin core type one. From this experience, we have tried to realize a skinless structure of hollow fiber.

We have found that in place of aqueous acid solution, best results are obtained by use of aqueous NaOH solution as the coagulation bath for the preparation of the desired dialyzing hollow fiber of skinless cross-sectional structure, representing a several times accelerated dialyzing performance.

The gap passage routes in the hollow fiber according to this invention represents in their cross-sectional dimension 200 A at the maximum. From this figure, it is definitely believed that the mean value of the fine gap sizes has been substantially elevated, thereby the several times improved dialyzing power being provided in comparison with conventionally attainable values.

When one of the hollow fibers according to this invention is observed under electron microscope, $x$ 20,000, max. 200 A fine passage routes in the form of a net-like structure can be found not only in the cross-section, but also in the longitudinal section of the hollow fiber, said passage routes being distributed throughout the cohole structure of the fiber in an amazingly even way and no skin being found on the inside as well as outside surface of the tubular fiber. When observed the inside and outside wall surface of the tubular fiber on an electron microscope, $x$ 8,000, a highly smooth appearance without no fine undulations is shown. From these electron-microscopic observations, it can be said that the hollow fiber according to this invention represents thus substantially even structure throughout the tubular wall of the fiber.

A predominant feature of the hollow fiber according to this invention and adapted for dialysis resides in the formation of no pin holes. On the contrary, in the case of the conventional skin core type fibers of the purely synthetic material, pin holes are frequently observed at such areas in which the skin layer has been partially or completely disappeared.

The second feature of the hollow fiber according to this invention resides in substantially smaller wall thickness than those of the conventional one. As an example, the wall thickness of the hollow fiber, when microscopically observed at its swollen state, amounts to only 11 $\mu$ with which, highly favorable dialyzing results can be assured. Since the wall thickness of the conventional cellulose triacetate hollow fiber amounts substantially to 25 $\mu$, the attained value is less than one half thereof. With thinner wall thickness, the dialyzing performance can naturally increased correspondingly.

With thinner wall thickness of the hollow fiber, the mechanical strength thereof must be considered. As the second requirement for use in the dialytic purpose, the mechanical strength of the hollow fiber according to this invention will be described in detail hereinbelow.

The mechanical strength in this respect may concern with tension, compression, bending and liquid pressure. It should be mentioned that when the hollow fibers are fitted in an artificial kidney unit, fibers must be bound together and relatively fixed at their ends into a mass by use of a binding agent, as an example. Therefore, when the individual fiber represents an inferior compressive strength, it will become collapsed at this stage. With inferior bending strength, the hollow fibers must be carefully treated during the dialyzing stage, resulting in a poor operational performance. When the hollow fibers represent only an inferior mechanical resistance against the applied liquid pressure, a correspondingly low blood pressure or buffer liquid pressure must be applied, resulting again in an inferior operational efficiency, also in this case.

As a representative measure of these various mechanical strength, the tensile strength of the hollow fiber can be used. It should be mentioned at this stage that the hollow fiber according to this invention has a three to five times higher tensile value than that of the conventional cellulose triacetate fibers.

It may be concluded that the superior tensile strength of the hollow fiber according to this invention is attributable to a higher degree of polymerization of the cellulose as used for the fiber. While the degree of polymerization under consideration of conventional hollow fibers amounts generally to only 200 – 300, that of the fiber according to this invention amounts to as high as 400 – 500.

Main factors affecting upon the degree of cellulose may be the kind of cellulose material, the preparing conditions of the spinning liquor, the viscosity of the latter and the spinning conditions. It may be stressed in this respect, the kind of the cellulose and thus of the spinning liquor is highly different from those utilized in the prior art. It is definitely believed that the higher tensile strength owned by the hollow fiber according to this invention should be derived from the specific selection of the fiber material or the use of cuprammonium regenerated cellulose.

It is therefore one of the substantial features of the invention to provide an efficient dialyzing hollow fiber consisting of cuprammonium regenerated cellulose.

A salient feature of the use of the dialyzing hollow fiber according to this invention resides in such that the conventionally encountered troubles caused by occasional introduction of cellulose micelles of lower polymerization degree scaled-off from inside wall surfaces of the fibers into the human body by the liquid carrier in the form of the human blood under dialysis can be effectively avoided by use of the higher polymerized cellulose as the fiber material proposed by the present invention.

The dialyzing hollow fiber according to this invention is made from cuprammonium regenerated cellulose and has an elongated continuous space core extending along the entire axis of the fiber and a substantially true-circular ring cross-section, the wall thickness being highly thin and substantially unified. The outer diameter of the hollow fiber amounts to from several tens to 1,000 microns and the wall thickness may be selected to from several to 450 microns according to occasional demands. As the hollow fibers for use in artificial kidney unit, the outer diameter may be selected to $100 - 400$ $\mu$ with the wall thickness of $10 - 40$ $\mu$.

In order to prepare the hollow fiber with above several novel features, cuprammonium cellulosic spinning liquor is extruded from a concentric outer ring orifice and the linear ringshaped liquid product is incorporated with an organic solvent core of non-coagulating character relative to the spinning liquor by simultaneous extrusion of said organic solvent through a centrally arranged core orifice of a concentric duplicate orifice nozzle so as to introduce the core solvent into the central core space of the outer ring shaped liquid string, thus in a sheath-and-core mode.

Then, the thus extruded sheath-and-core composite liquid string is caused to drop freely through a gaseous atmospheric space, preferably of atmospheric air, so as to let it extend by gravity action, to a certain satisfying degree for reducing the overall diameter of the composite liquid string which is then introduced into a bath of aqueous NaOH-solution for subjecting it to a gradual coagulation and at an incomplete normann effect.

The regenerated and coagulated string having the liquid solvent core maintained therein is then treated continuously by successive passes through several baths for rinsing, diluted acid treating and second rinsing and through a drier to form the final product of hollow fiber which may be wound up on a winding roll. As an alternative measure, the thus formed gel-state hollow filament is processed and wound up on a hank reel and the hank can be treated successively through several steps of first rinsing, acid washing, second rinsing and drying.

As was referred to hereinbefore, the composite liquid string extruded from the duplicate spinneret is let to fall under gravity action for stretching purpose. During this falling stage, the string is in its liquid stage without any coagulation and thus, the desired stretching is carried into effect in an easy way and to such a degree as having a diameter of several hundreds microns. Thanks to the surface tension owned by the liquid string, the wall thickness of the hollow string has a highly stabilized constant value when seen at any cross-section along the whole length of the string.

As the core liquid organic solvent of non-coagulant nature relative to the spinning liquor may be a member selected from the group consisting of aromatic hydrocarbons (such as benzene, xylene, toluene, ethyl benzene, mesitylene, cymene, stylene and the like), aliphatic hydrocarbons (such as normal hexane, cyclohexane, normal pentane, cyclopentane, cyclohexene, isopentane, cyclohexadiene and the like) and halogenated hydrocarbons (such as trichloroethylene, perchloroethylene, chloroform, methyl chloroform, dichloroethane, tetrachloroethane, chlorobenzene, trichlorotoluene and the like).

According to the prior art technique, cuprammonium cellulose may be coagulated by introducing it into a warm water bath. When the outer diameter of the dual extrusion orifice is of 5 mm, as a representative employed in the present invention, which means a rather larger size of orifice, the overall length of a spinning funnel if used according to the representative prior art may extend for several meters in case of the use of a coagulating bath consisting of warmed water, thus highly disadvantageous for the industrial purpose. In addition, the warmed water or coagulation bath liquid provides a considerable amount of frictional resistance to the outer surface of traveling filament, resulting in disadvantageous roughning of the outer surface of the hollow fiber and, at the same time, in substantial fluctuation in the wall thickness. According to our practical experiments, similar drawbacks have been experienced with the extrusion of the composite liquid string directly into a liquid bath consisting of a different coagulant from the above. Therefore, the free falling step of the composite liquid string through the gaseous atmospheric zone is proposed to employ in carrying out the process according to this invention.

In advance of the coagulating step of the composite liquid string, the latter should be subjected to stretching substantially to the desired final shape and dimensions during the gravity falling step. A later stretching of the filament as carried out during its passage through the coagulation bath should be avoided as far as possible, from the reasons of inferior dialyzing performance of the produced hollow fiber, on account of the various defects set forth hereinbefore.

The coagulation by contact with aqueous NaOH-solution should be carried out at a relatively slow speed.

The coagulation progresses naturally from outside to inside of the tubular cuprammonium cellulose string. There are different conditions between the outer and the inner zone of the string sheath and thus a different structures may be feared to appear in the sheath when seen at the cross-section thereof of the final product. However, when observed the prepared hollow fiber on an electronic microscope, the reverse is true to fact. spite in spite of rather heavier wall thickness of the wall of the sheath or hollow fiber, the structure when viewed in the cross-sectional as well as longitudinally sectional directions is of a highly even and homogeneous gap passage network throughout the fiber-forming material.

The coagulation of cuprammonium cellulose in the aqueous NaOH-solution bath is characterized by the formation of the normann compound. For the realization of the normann reaction to a full degree, at least a 20 wt. % of NaOH-concentration must be employed and the coagulation must be carried out for a rather extended reaction period, as determined by our practical experiments. When observed the fully normannrized cuprammonium fiber in its cross-section on an electron microscope, a skin core structure is found and the dialytic power is rather inferior when compared with that of the conventional cellulose triacetate hollow fibers.

According to our knowledge, the hollow fiber of skinless structure provides the best result. In order to fulfil this, the concentration of aqueous NaOH-solution for the coagulation bath should be selected to a rather low value and the coagulation should be carried out rather slowly, yet in a rather short time period, so as to realize the normann reaction to a rather incomplete degree.

For this purpose, the concentration of aqueous NaOH-solution should be set preferably 5 – 15 wt. %. With still lower concentration than 5 wt. %, the coagulation can not be invited at least for the industrial purpose. On the contrary, with a higher concentration than 15 wt. %, disadvantageous hollow fiber of skin core structure would be produced. The degree of normannrization should be set preferably less than 50%.

According to our practical knowledge, the above mentioned favorable structure of the hollow fiber realized during the coagulation step can be maintained in the final products only when caution has been given to the conditions at the drying stage. When the coagulated and wet-treated hollow fiber be dried up rapidly at a high temperature and under tension, the fine gap passage routes of the order of max. 200 A formed in advance within the material of the hollow fiber would disappear and do not recover the once optimumly formed network of fine gap passage routes even in the case of the fiber brought to its swollen state by contact with water or aqueous solution. The critical temperature for the desired drying conditions has been found at 150°C.

For the maintenance of the fine gap passage network of the hollow fiber according to this invention, having been formed in advance of the drying-up stage, even after the last-mentioned stage, the natural draught drying process is most preferable at least from the theoretical point of view. However, this process consumes in practice an unacceptably longer period of time from the industrially manufacturing point of view. Thus, in practice, a temperature range of drying atmosphere of 100°– 140°C is recommendable, because at such temperatures, the once realized overall fine gap passage network of the hollow fiber can not be subjected to an appreciable change.

By drying the hollow fiber including therein the core of non-coagulating organic liquid solvent, the aqueous content in the material of the fiber sheath only is subjected to drying and the hollow tubular structure of the fiber will be maintained as before. The organic solvent core can be removed by mechanical cutting of the hollow fiber filament into lengths.

Since the organic liquid solvent core is always statically included in the core space of the hollow fiber throughout its several successive manufacturing steps, the first under preparation is not subjected to any appreciable mechanical and/or fluid friction at the inside tubular wall surface during the coagulating, regenerating, rinsing and drying steps, thus avoiding positively otherwise appearing deposits of hemi-cellulose particles on the inside surface, as well as the formation of fine undulations otherwise to be formed thereon so as to form and maintain a highly smooth inside surface, even when observed on electron microscope.

In the following, the invention will be described more in detail by reference to the accompanying drawing and several numerical examples.

Figure 1:
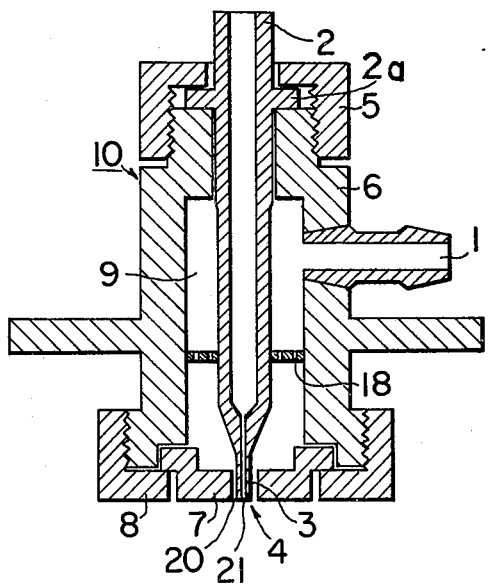
FIG. 1 is a sectional elevation of a spinning nozzle unit adapted for the extrusion of a hollow fiber according to the invention.
Figure 2:
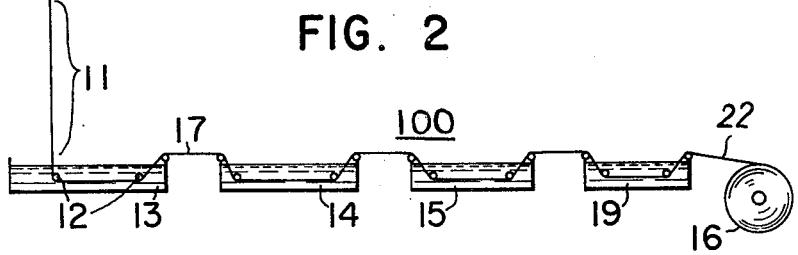
FIG. 2 is a schematic view of a preferred embodiment of a manufacturing plant adapted for carrying out of the process according to this invention.
Figure 3:
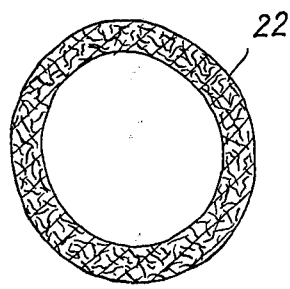
FIG. 3 is an enlarged schematic cross-section of the hollow fiber according to this invention.

Referring now to FIGS. 1 – 3 of the accompanying drawing, a preferred embodiment of an apparatus for the manufacturing the novel fiber and process according to the present invention will be described hereinbelow in detail.

Numeral 10 represents a spinneret unit which is formed with an inside chamber 9 adapted for provisionally accumulating a spinning liquor to be described more fully hereinafter, said liquor being supplied under pressure from a reservoir by a conventional spinning pump through an inlet pipe 1 detachably attached to the housing at 6 of the unit 10, although not specifically shown, said chamber 9 being formed in the interior space of said housing as shown.

A second inlet pipe 2 adapted for introducing non-coagulating liquid for the spinning liquor is mounted concentrically at the interior space of said housing 6, said inlet pipe being connected through a proper piping to a pressurized supply source, although not shown.

The lower end of the chamber 9 is sealingly closed by a nozzle plate 7 having centrally positioned a duplicate orifice 4 and kept fixedly in position by an internally threaded ring fixture 8 which is detachably attached to the lower end portion of said housing 6. The duplicate orifice 4 consists of an outer ring orifice 20 kept in fluid communication with the chamber 9, and a concentric core orifice 21 which is formed by the reduced tip end part of said second inlet pipe 2 vertically passing through the unit 10. The upper part of inlet pipe 2 projects from the upper end of the housing 6 and flanged at 2a for being mounted thereon, said pipe 2 being firmly held in position by an internally threaded ring cap 5 which is detachably attached to the reduced and male threaded upper part of the housing 6. At an intermediate level within the chamber 9, there is provided a perforated rectifier ring 18 which is fixedly mounted between the inside wall surface of the housing 6 and the outer tubular surface of middle part of the second inlet pipe 2.

The spinning liquor supplied through first inlet pipe 1 is introduced into the upper part of the chamber 9 arranged above rectifier plate 18 and then into the lower part of the same chamber positioned below the latter, upon passage therethrough. The spinning liquor is then extruded downwards substantially at a constant pressure through the outer ring-shaped outlet orifice 20.

On the other hand, the non-coagulating liquid fed through second inlet pipe 2 is extruded through the central core orifice 21 in a concentric arrangement with the outer spinning liquor, thus forming the core medium relative thereto. The thus jointly extruded composite core-and-sheath liquid string is substantially freely dropped through an open atmospheric space at 11 to be fully extended in its length by gravity action after leave from the composite orifice 4.

The thus extended composite liquid filament is then supplied to and processed in a coagulating and after-treating unit 100 positioned at a lower level from the spinneret unit 10 and comprising coagulating bath 13, first rinsing bath 14, regenerating bath 15 and second rinsing bath 19. Thus, the extruded composite liquid filament is introduced firstly into the coagulating bath 13 positioned directly below the orifice 4 and fitted with a stationary or rotatable guide bars 12 which are so arranged that the vertically introduced and at least partially coagulated filament is deflected in its travelling direction from vertical to horizontal by means of these guide bars 12 dipped in the coagulation bath liquid 13 consisting of aqueous NaOH-solution as referred to hereinbefore. By passage of the filament or fiber through the bath 13, it is completely coagulated as shown at 17 and then led to pass successively through a first water-rinsing bath 14, a diluted surfuric acid bath 15 adapted for regeneration, and a second water-rinsing bath 19. The thus coagulated and regenerated filament is passed through a conventional drier, not shown, and wound up on a winding roll 16.

EXAMPLE 1

A conventionally prepared cuprammonium cellulose spinning solution, cellulose content 10.0 wt. %, ammonium content 7.0 wt. % and copper content 3.6 wt. %, viscosity : 2,000 poises, was extruded through an outer ring-shaped orifice, 5 mm diameter, of the duplicate style as was referred to hereinbefore in connection with FIG. 1 at a delivery rate of 20 ml/min.

At the same time, perchloroethylene was extruded through a central core orifice, 1 mm diameter, of the same duplicate nozzle at a delivery rate of 5 ml/min, so as to fill the core space of the ring-shaped liquid string.

This sheath-and-core composite string was let to fall under gravity by a vertical length of 300 mm in open air atmosphere, the outside diameter of said composite liquid string being thereby reduced to 600 $\mu$ under the influence of the gravity stretch. The liquid string was then introduced vertically into a coagulation bath comprising an aqueous NaOH-solution of 11 wt. % concentration kept at 25°C and extending horizontally for a length of 8 m. The travelling speed of the filament through the coagulation bath was set to 100 m/min. The degree of the normannrization amounted to about 30%.

The thus coagulated hollow fiber of filament was taken out on a revolving hank frame, not shown, and kept thereon for about 2 hours. The hank was suspended from a bar and sufficiently rinsed with fresh water by means of a shower. Then, the hank was treated in a diluted sulfuric acid bath, of 3 wt. % concentration, for the regeneration purpose, and rinsed with fresh water. The thus treated hank was suspended from a moving frame and passed through a tunnel drier for drying in a hot air atmosphere, 130°C. The hank was finally and mechanically cut into proper lengths for recovery of the contained core liquid solvent and kept in a calm room at normal temperature for several hours.

The thus obtained hollow fibers represented an outer diameter of 290 $\mu$ with a wall thickness of 25 $\mu$ which was found substantially precisely constant at any cross-section along the axis of each of the hollow fibers.

These hollow fibers were swollen with water and observed under an electron microscope, $x$ 20,000 times, showing a network of even gap passage routes structure, being substantially similar at the cross-section as well as the longitudinal section of the fiber, representing gaps of max. 200 A. It was amazingly observed that at each cross-section, there is no skin formation. The fine gap network was of highly uniform distribution throughout the whole mass of the hollow fiber, when seen in the cross-section, as well as longitudinal section.

At a further observation of the sections of the hollow fiber, at a magnetification of 8,000 times, under an electron microscope, almost no undulations were found on the inside and outside wall surface of the hollow fiber and further, no deposits of hemi-cellulose particles deposited on the inside wall surface of the hollow fiber, thus representing a highly smooth surface on the inside wall of the hollow fiber even by review thereof under an electron microscope.

Comparative test data of the novel hollow fiber and a representative dialyzing conventional one, made of cellulose triacetate, are given in the following Table 1, concerning their structure, tensile strength and tensile elongation.

Table 1

| Item | Unit | Conv. | Inventive |
| --- | --- | --- | --- |
| O. D. | $\mu$ | 285 | 290 |
| Wall Thickness | $\mu$ | 25 | 25 |
| Tensile Str. (wet) | g | 23.0 | 103.2 |
| Elongation (wet) | % | 27.3 | 32.7 |
| Tensile Str. (dry) | g | 92.0 | 277.4 |
| Elongation (dry) | % | 14.4 | 24.3 |

As is clear from the foregoing data, the hollow fiber according to this invention represents about three times higher tensile strength than that of the conventional one.

In the following Table 2, comparative test data in model liquid dialysis are shown, especially of the re- Table 2

| | Item | Unit | Conventional | Inventive |
| --- | --- | --- | --- | --- |
| Main Sizes of Sample | O. D. | $\mu$ | 285 | 290 |
| | Wall Thickness | $\mu$ | 25 | 25 |
| Dialyzing Conditions | Effective Filtering Area | m² | 1.0 | 1.0 |
| | Length of Hollow Fiber | mm | 135 | 135 |
| | Blood Passage Rate | ml/min | 200 | 200 |
| | Buffer Passage Rate | ml/min | 500 | 500 |
| | Press. Differential | mm Hg | −200 | −200 |
| Dialyzing Performance | Removal of Urea | % | 63.5 | 64.2 |
| | Removal of Albumin | % | 0 | 0 |
| Ultra-Filtration | Treating Condition (Pressure) | mm Hg | +400 | +400 |
| | Filtration Rate | ml/m²·Hr | 430 | 1020 | moval rate of albumin and urea and those of untrafiltration velocity.

As the model liquid use was made of an aqueous solution containing 0.1 wt. % of albumin and 0.167 N of urea in these tests.

From the data shown in the foregoing Table 2, the inventive hollow fiber has superior performance for removal of protein (albumin) and for allowing the passage of urea, comparative to bests of conventional comparative hollow fibers. It should be stressed, however, that the novel hollow fiber has a 2.5 times or still higher ultra-filtration velocity than those of conventional comparative fibrous products.

In addition, it may be seen that the novel fiber represents a substantially superior water permeability over conventional fibers.

According to our test results, it was found that there is no pin holes on 50,000 novel hollow fibers according to this invention, each being of 135 mm.

EXAMPLE 2

Hollow fibers, O. D. 285 $\mu$, wall thickness 11 $\mu$, were prepared in the similar way as before.

The spinning liquor was extruded at a rate of 13 ml/min, and trichloroethylene was extruded at a rate of 5 ml/min, the length of free falling zone extending for a length of 310 mm.

The sectional structures of each of the thus prepared hollow fibers were similar to those of the foregoing hollow fibers obtained in the foregoing Example 1, when observed under an electron microscope.

The dialyzing power of the present hollow fiber carried out by use of a model liquid of the similar kind as before was such as :

removal rate of albumin

0%;

removal rate of urea

71%

Thus, the performance was superior as before.

The wall thickness of 11 $\mu$ corresponds generally to about one-half of that of conventional cellulose hollow fiber. From this reason, the ultrafiltration velocity showed a remarkably high value of 1,250 ml/m$^2$· Hr under the condition of (live pressure plus 400 mm Hg).

EXAMPLE 3

Hollow fibers were prepared under similar conditions as employed in the foregoing Example 1, O. D. 350 $\mu$, wall thickness 20 $\mu$, at a winding speed of 120 m/min. The extrusion rate of the spinning liquor was 25 ml/min and that of the core benzene solvent was 7 ml/min.

The falling distance was 270 mm. Coagulation, regeneration, rinsing and drying steps were similar as employed in Example 1.

The sectional representations of the hollow fiber were similar to those observed in Example 1.

The dialyzing performance of the hollow fiber by use of model test liquid was as follows :

removal rate of albumin

0%;

removal rate of urea

61%.

thus, showing superior results as before.

The ultrafiltration velocity amounted to 980 ml/m$^2$· Hr at the treating condition of (live pressure + 400 mm Hg), thus being superior as before.

EXAMPLE 4

Hollow fibers were prepared under similar conditions as before. O. D. 800 $\mu$, wall thickness 70 $\mu$. Winding speed : 100 m/min. The extrusion rate of spinning liquor was set to 62 ml/min, while that of the core solvent, normal hexane, amounted to 12 ml/min.

The extruded liquid state sheath-and-core composition was led to fall along a vertical distance of 300 mm and then introduced into a coagulation bath consisting of aqueous NaOH-solution, of 15 wt. %. The coagulated filament was passed through a diluted aqueous H$_2$SO$_4$-solution bath of 7 wt. % concentration and finally wound on a hank frame.

The hank was enough rinsed and gradually dried up at 130°C. The core of the hollow fiber represented an elliptical cross-section. The cross-sectional structure was similar to that as seen in the Example 1.

COMPARATIVE TEST

Hollow fibers were prepared under similar conditions as employed in Example 1. The concentration of the aqueous NaOH-solution was, however, set to a concentration of 40 wt. %. The sheath-and-core liquid composition was immersed to a full degree, so as to attain a 100%-normannrizing.

When observed the thus prepared hollow fiber under an electron microscope, a disadvantageous skin core structure. The ultrafiltration velocity in this case amounted under similar test conditions as mentioned in Example 1 to 400 ml/m$^2$. Hr., thus being substantially inferior value.

A cross-section of the hollow fiber is representatively and schematically shown at 22 in FIG. 3. The same reference numeral is shown in FIG. 2 to show the finishing position of such hollow fiber.

The embodiments of the invention in which an exclusive property or privilege is claimed are defined as follows:

1. A dialyzing hollow fiber of cuprammonium regenerated cellulose having a smooth, skinless inner and outer wall surface and said wall having distributed throughout its thickness a netlike structure of passage routes, the routes having a diameter of not greater than 200, and said fiber having been prepared by the steps of extruding a spinning liquor of cuprommonium regenerated cellulose to form a hollow core extrudate and simultaneously therewith passing a non-coagulating organic solvent through the hollow core;

passing the resulting extrudate through a gaseous atmosphere whereby the weight of said extrudate causes stretching to substantially reduce the outer diameter thereof;

coagulating the hollow core extrudate by contacting said extrudate with a solution containing aqueous sodium hydroxide to form a hollow core fiber having a smooth, skinless inner and outer wall; and rinsing and drying the resulting fiber.

2. The fiber of claim 1 wherein the outer diameter is not greater than 1,000 $\mu$.

3. The fiber of claim 1 wherein the wall thickness is not greater than 450 $\mu$.

4. A process for the manufacture of a dialyzing hollow fiber having distributed throughout its thickness a net-like structure of passage routes which comprises the steps of extruding a spinning liquor of cuprommonium regenerated cellulose to form a hollow core extrudate and simultaneously therewith passing a non-coagulating organic solvent through the hollow core;

passing the resulting extrudate through a gaseous atmosphere whereby the weight of said extrudate causes stretching to substantially reduce the outer diameter thereof;

coagulating the hollow core extrudate by contacting said extrudate with a solution containing aqueous sodium hydroxide to from a hollow core fiber having a smooth, skinless inner and outer wall; and rinsing and drying the resulting fiber.

5. The process according to claim 4 wherein the non-coagulating organic solvent is selected from the group consisting of aromatic hydrocarbons, aliphatic hydrocarbon and halogenated hydrocarbons.

6. The process of claim 4 wherein the sodium hydroxide is present in the solution in an amount from 5% to 15% by weight.

7. The process of claim 4 wherein the fiber is dried at a temperature of up to 150°C.

* * * * *